US009501083B2

(12) United States Patent
Zhou et al.

(10) Patent No.: US 9,501,083 B2
(45) Date of Patent: Nov. 22, 2016

(54) ACCELERATOR AND BRAKE PEDAL DEVICE AND VEHICLE USING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xiao-Gang Zhou, Shenzhen (CN); Wei-Min Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/683,366

(22) Filed: Apr. 10, 2015

(65) Prior Publication Data

US 2016/0070293 A1    Mar. 10, 2016

(30) Foreign Application Priority Data

Sep. 9, 2014    (CN) .......................... 2014 1 0454233

(51) Int. Cl.
| | |
|---|---|
| G05G 1/30 | (2008.04) |
| B60T 7/04 | (2006.01) |
| G05G 9/02 | (2006.01) |
| F02D 29/02 | (2006.01) |
| B60K 26/02 | (2006.01) |

(Continued)

(52) U.S. Cl.
CPC ................ G05G 9/02 (2013.01); B60K 26/02 (2013.01); B60K 26/04 (2013.01); B60T 7/042 (2013.01); F02D 29/02 (2013.01); G05G 1/34 (2013.01); B60K 2026/046 (2013.01); G05G 1/30 (2013.01)

(58) Field of Classification Search
CPC .......... G05G 1/30; G05G 1/305; G05G 1/34; G05G 1/36; G05G 1/38; G05G 1/46; G05G 9/02; B60T 7/04; B60K 26/02; B60K 2026/046; B60K 26/04; B60K 2741/205; B62K 2015/003; F02D 29/02; Y10T 74/20534

See application file for complete search history.

(56) References Cited

U.S. PATENT DOCUMENTS

| | | | | |
|---|---|---|---|---|
| 2,242,145 A | * | 5/1941 | Rushfeldt | .............. B60K 41/20 74/512 |
| 3,331,479 A | * | 7/1967 | Frontera | ................ B60K 41/20 477/215 |

(Continued)

FOREIGN PATENT DOCUMENTS

| | | | | |
|---|---|---|---|---|
| FR | | 2930056 A1 * | 10/2009 | ............... G05G 1/36 |
| IN | WO 2011024195 A2 * | | 3/2011 | ................ B60T 7/06 |

*Primary Examiner* — Adam D Rogers
(74) *Attorney, Agent, or Firm* — Zhigang Ma

(57) ABSTRACT

An accelerator and brake pedal device includes a connecting lever, a brake pedal assembly, an accelerator pedal assembly, an accelerator control circuit, and a resisting member. The brake pedal assembly is coupled to the connecting lever. The accelerator pedal assembly is rotatably coupled to the brake pedal assembly. The accelerator control circuit has an accelerator control switch. The resisting member is positioned on the connecting lever away from the brake pedal assembly. The accelerator control switch is resisted to turn off by the resisting member and break the accelerator control circuit. The resisting member is moved by the accelerator pedal assembly toward the accelerator control switch. The accelerator control circuit is rendered inoperative when the resisting member is moved by the accelerator pedal assembly toward the accelerator control switch. The accelerator control circuit is rendered operative when the accelerator pedal assembly is released.

1 Claim, 4 Drawing Sheets

(51) Int. Cl.
*B60K 26/04* (2006.01)
*G05G 1/34* (2008.04)

(56) References Cited

U.S. PATENT DOCUMENTS 4,060,144 A * 11/1977 Teti .................. B60K 26/02
                                                180/317

4,802,381 A * 2/1989 Lo ..................... B60T 1/06
                                                74/512
5,599,255 A * 2/1997 Ki-Dong ............ G05G 1/305
                                                477/211
5,957,811 A * 9/1999 Gustafsson .......... B60K 26/02
                                                29/401.1
6,415,681 B1 * 7/2002 Porter ................. G05G 1/305
                                                192/13 R

* cited by examiner

ACCELERATOR AND BRAKE PEDAL DEVICE AND VEHICLE USING SAME

FIELD

The subject matter herein generally relates to an accelerator and brake pedal device and a vehicle using the accelerator and brake pedal device.

BACKGROUND

An accelerator and a brake pedal are separately positioned in a vehicle. Driver's right foot should operate the accelerator and the brake pedal separately. However, traffic accidents are easily caused because the driver takes an instinctive step on the accelerator pedal in an emergency.

BRIEF DESCRIPTION OF THE DRAWINGS

Implementations of the present technology will now be described, by way of example only, with reference to the attached figures.

DETAILED DESCRIPTION

Figure 1:
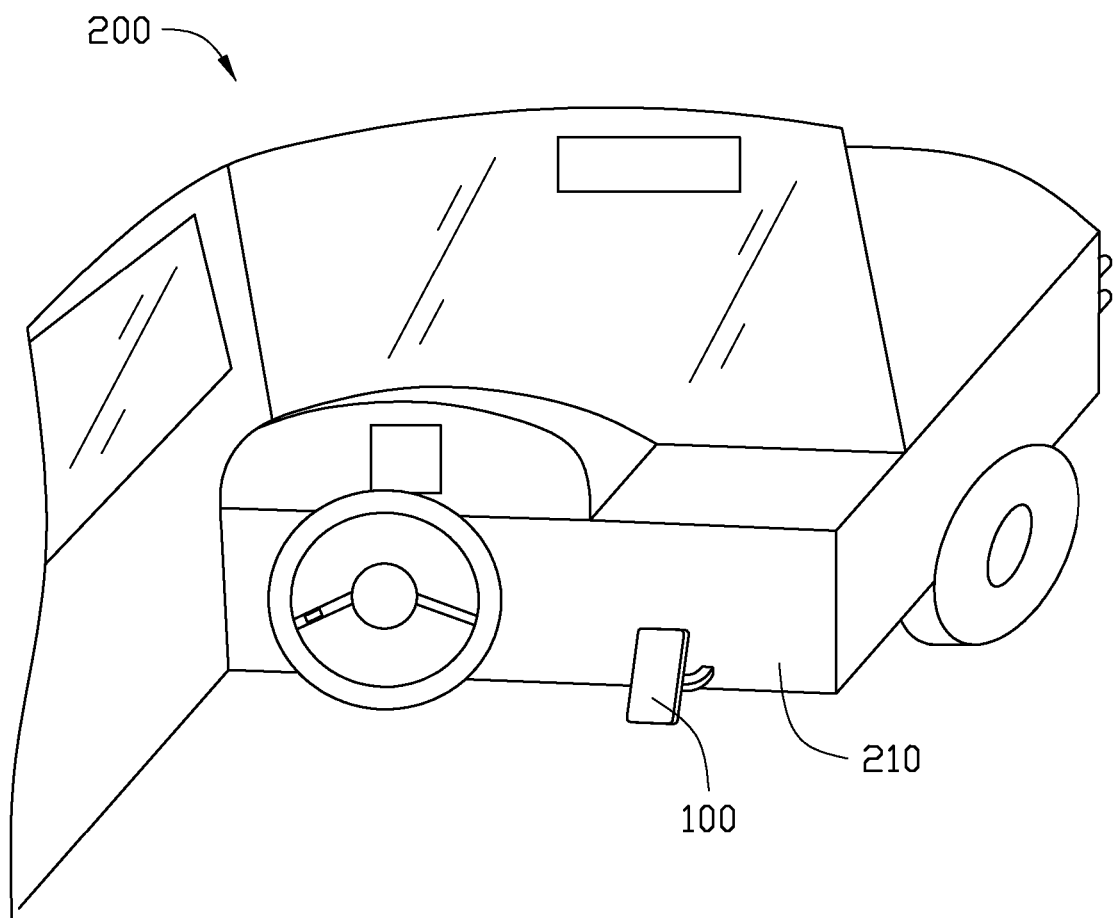
FIG. 1 illustrates a diagrammatic view of a vehicle including an accelerator and brake pedal device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to;" it specifically indicates open-ended inclusion or membership in the so-described combination, group, series and the like.

The present disclosure is described in relation to an accelerator and brake pedal device and a vehicle using the accelerator and brake pedal device. The accelerator and brake pedal device can include a connecting lever, a brake pedal assembly, an accelerator pedal assembly, an accelerator control circuit, and a resisting member. The brake pedal assembly can be coupled to the connecting lever. The accelerator pedal assembly can be rotatably coupled to the brake pedal assembly. The accelerator control circuit can have an accelerator control switch. The resisting member can be positioned on the connecting lever away from the brake pedal assembly. The accelerator control switch can be resisted to turn off by the resisting member and break the accelerator control circuit. The resisting member can be moved by the accelerator pedal assembly toward the accelerator control switch. The accelerator control circuit can be rendered inoperative when the resisting member is moved by the accelerator pedal assembly toward the accelerator control switch. The accelerator control circuit can be rendered operative when the accelerator pedal assembly is released.

Figure 2:
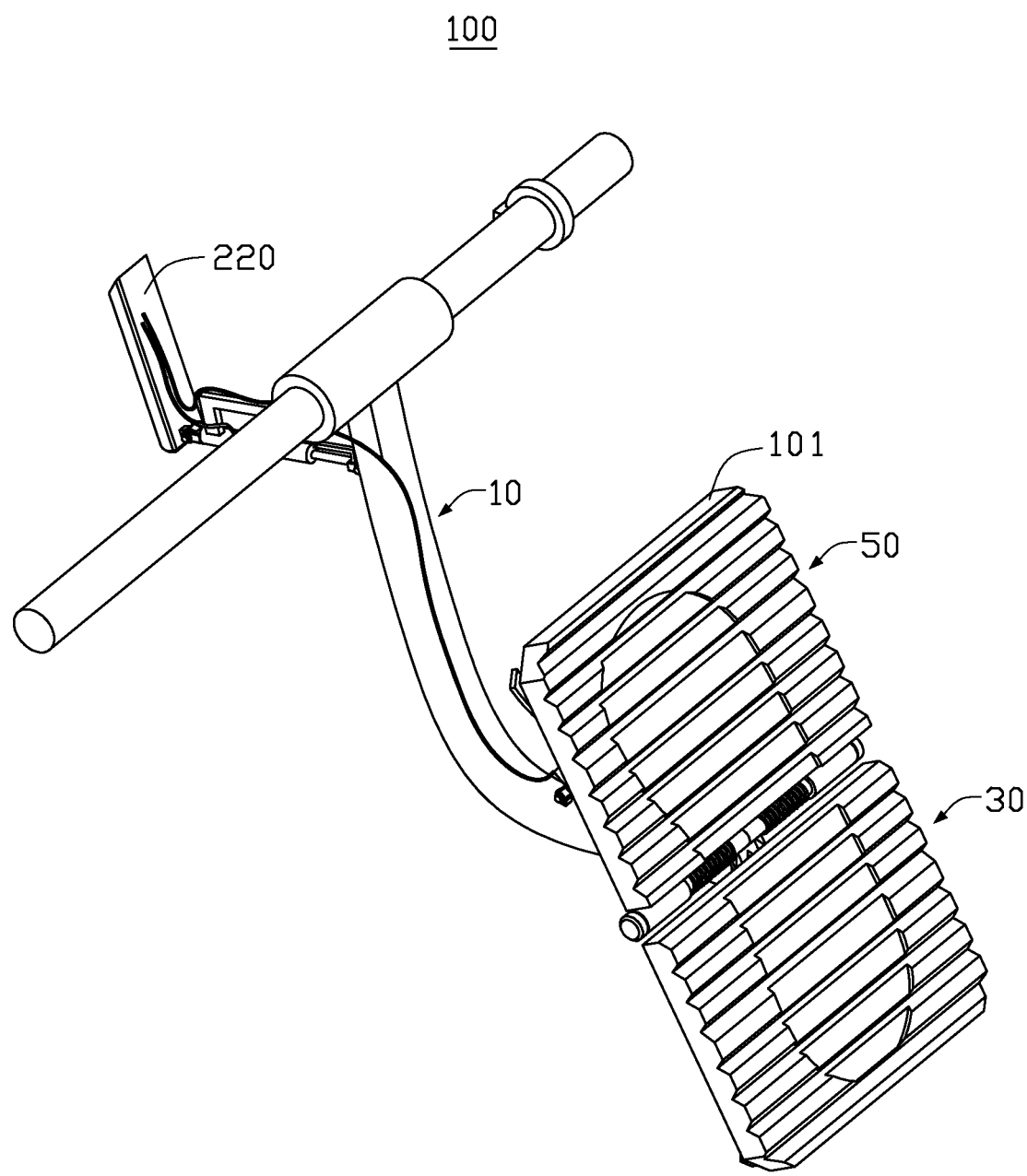
FIG. 2 illustrates an assembled, isometric view of the accelerator and brake pedal device.

FIG. 1 illustrates a vehicle 200 including a vehicle body 210, a vehicle frame 220 (part of the frame 220 is shown in FIG. 2) positioned in the vehicle body 210, and an accelerator and brake pedal device 100 coupled to the vehicle frame 220. The vehicle 200 can include other functional mechanism and models, such as a control system, a power system, but it is not described here for simplify.

FIG. 2 illustrates the accelerator and brake pedal device 100. Also referring to FIG. 3, the accelerator and brake pedal device 100 can include a connecting lever 10, a brake pedal assembly 30, a resetting member 40, an accelerator pedal assembly 50, two elastic members 60, an accelerator control circuit 80, and a resisting member 90 (as shown in FIG. 4). The connecting lever 10 can be coupled to a brake system including a hydraulic device of the vehicle 200 at a first end. The brake pedal assembly 30 can be coupled to a second end of the connecting lever 10. The accelerator pedal assembly 50 can be rotatably coupled to the brake pedal assembly 30. The accelerator control circuit 80 can be coupled to the accelerator pedal assembly 50 and electrically coupled with an accelerator system (not shown) of the vehicle 200. The resisting member 90 can be positioned on the connecting lever 10 away from the brake pedal assembly 30.

Figure 3:
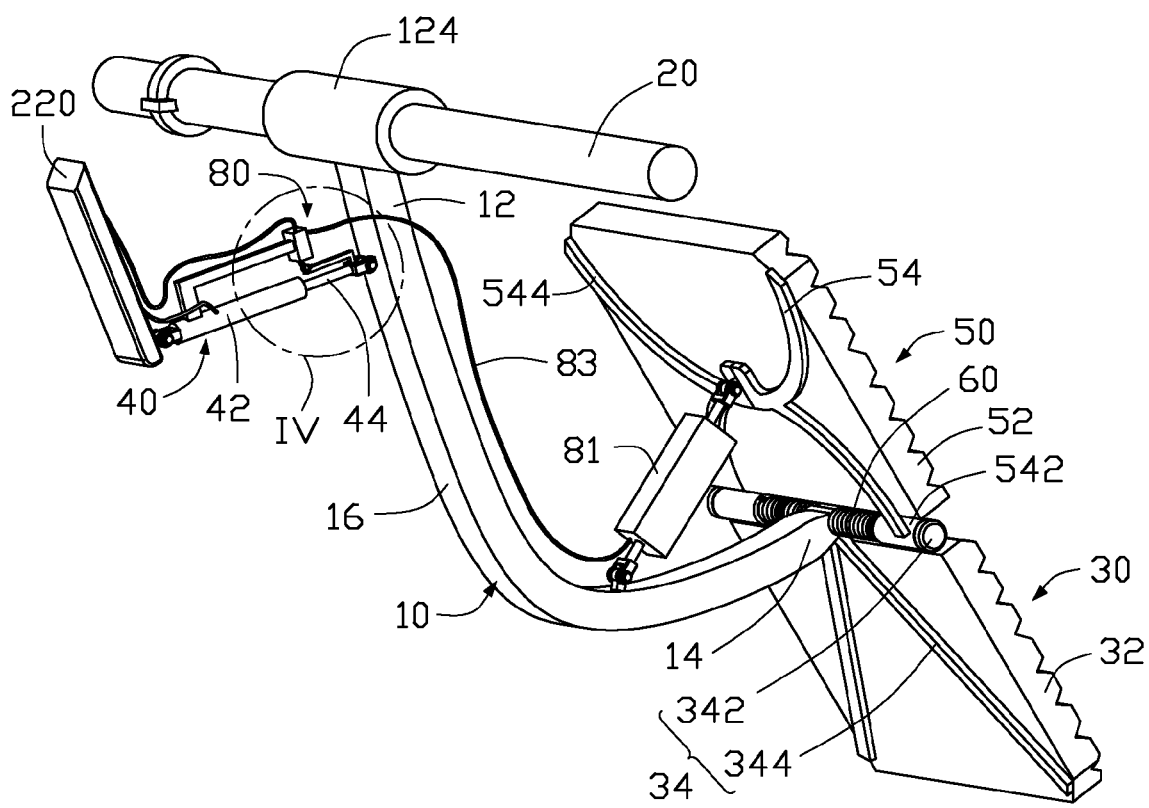
FIG. 3 is similar to FIG. 2, but from another angle.
Figure 4:
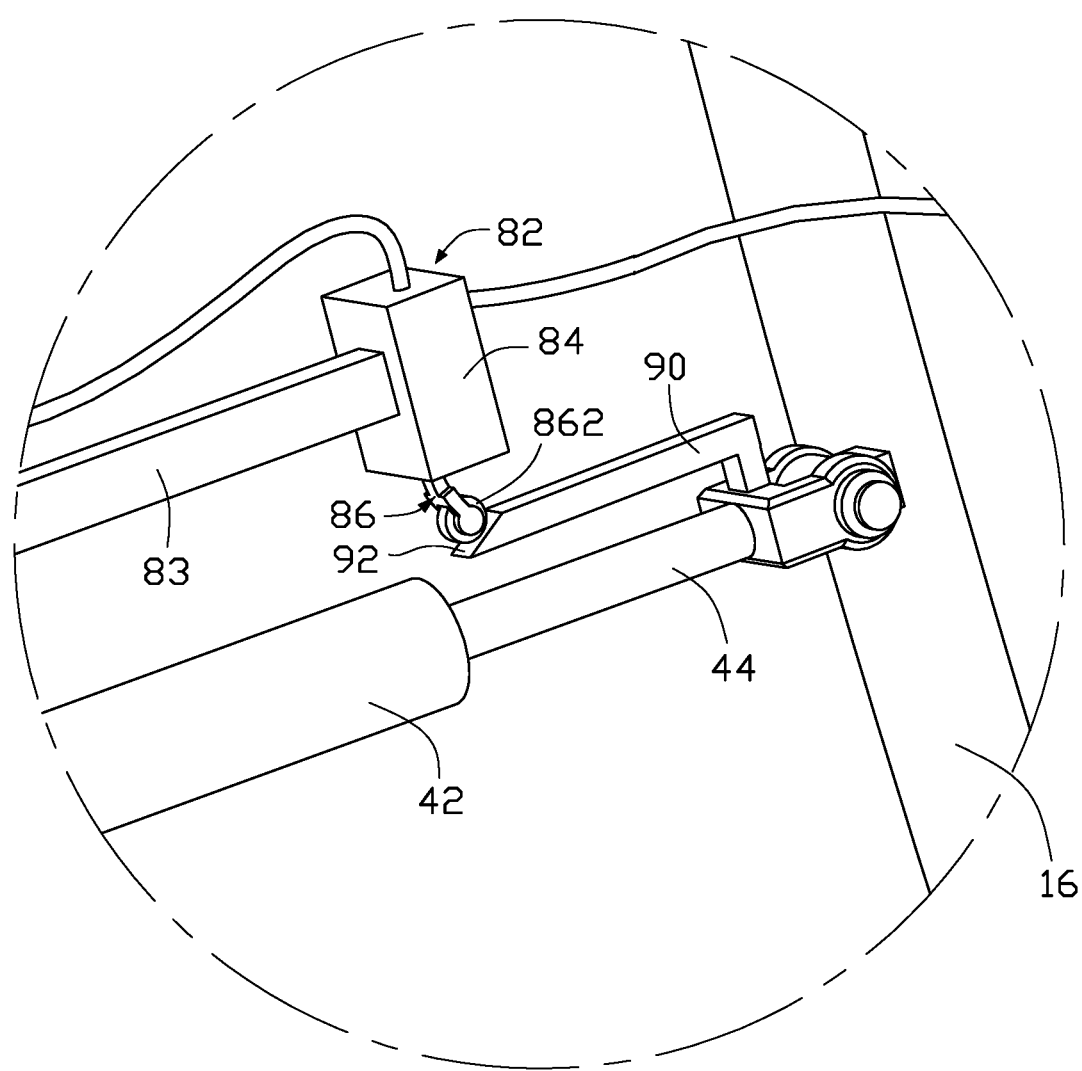
FIG. 4 illustrates an enlarged area of IV of the accelerator and brake pedal device of FIG. 3.

Referring to FIG. 3, the connecting lever 10 can be substantial in an L-shape. The connecting lever 10 can be somewhat curved, including a first end portion 12, a second end portion 14, and a rod portion 16. The first end portion 12 and the second end portion 14 can extend from two ends of the rod portion 16. The first end portion 12 can be operatively coupled to the braking system. In the illustrated embodiment, a sleeve 124 can be positioned on the first end portion 12, and a pivot shaft 20 can pass through the sleeve 124 for coupling with the brake system.

The brake pedal assembly 30 and the accelerator pedal assembly 50 can be positioned on the second end portion 14. The brake pedal assembly 30 and the accelerator pedal assembly 50 can cooperatively form one pedal 101. The brake pedal assembly 30 can be a lower portion of the pedal 101, and the accelerator pedal assembly 50 can be an upper portion of the pedal 101, so that a driver can just step on the one pedal 101 for braking or accelerating the vehicle 200.

The brake pedal assembly 30 can include a brake pad 32 and a first bracket 34. The first bracket 34 can include a connecting portion 342 and a supporting portion 344. The connecting portion 342 can be fixedly coupled to the second end portion 14. The supporting portion 344 can extend from the first bracket 34 and positioned away from the second end portion 14. The supporting portion 344 can be fixed to the brake pad 32 for holding and supporting the brake pad 32.

The resetting member 40 can be coupled to the rod portion 16 adjacent to the first end portion 12 for helping the connecting lever 10 returning an original position. The resetting member 40 can be a nitrogen gas spring. The resetting member 40 can include a pressure pipe 42 and a piston rod 44 movably positioned in one distal end of the pressure pipe 42. Another distal end of the pressure pipe 42 away from the piston rod 44 can be configured to couple with a portion of the vehicle frame 220. The piston rod 44 can be coupled to the rod portion 16 of the connecting lever 10. Nitrogen gas can be compressed when the brake pad 32 is forced to move downward and the piston rod 44 is moved toward the pressure pipe 42 by the connecting lever 10. The connecting lever 10 can return its original position because of a restoring force of the nitrogen gas in the pressure pipe 42 when releasing the brake pad 32.

The accelerator pedal assembly 50 can include an accelerator pad 52 and a second bracket 54 holding and supporting the accelerator pad 52. The second bracket 54 can include two mounting portions 542 and a holding portion 544 fixedly coupled to the mounting portions 542. The holding portion 544 can be positioned away from the supporting portion 344. Each mounting portion 542 can rotatably sleeve on a respective one end of the connecting portion 342. The holding portion 544 can hold and support the accelerator pad 52.

Each elastic member 60 can be sleeved on the connecting portion 342. One end of each elastic member 60 can resist a respective one mounting portion 542, and another end of the elastic member 60 can resist the supporting portion 344. In the illustrated embodiment, the elastic members 60 can be torsion springs. In other embodiments, the number of the elastic member 60 can be one, three or more.

Zigzag structures can be formed on surfaces of the brake pad 32 and the accelerator pad 52 to prevent a driver's shoe from slipping. In other embodiments, a rubber sheet can be formed on the surfaces of the brake pad 32 and the accelerator pad 52.

The accelerator control circuit 80 electrically coupled to the accelerator system. Referring to FIG. 4, the accelerator control circuit 80 can include an accelerator shaft sensor 81 and an accelerator control switch 82. The accelerator shaft sensor 81 can be positioned between the connecting lever 10 and the accelerator pedal assembly 50. The accelerator shaft sensor 81 can be used for detecting a downward movement amount of the accelerator pad 52 and sending data to the accelerator system for accelerating. In the illustrated embodiment, the accelerator shaft sensor 81 can be rotatably coupled between the rod portion 16 and the holding portion 544, the accelerator shaft sensor 81 and an accelerator control switch 82 can be electrically coupled to each other via electrical wires 83. In other embodiments, the accelerator shaft sensor 81 can be just positioned on the holding portion 544 or the accelerator pad 52.

Referring to FIG. 3, the accelerator control switch 82 can include a supporting rod 83, a switch body 84, and an operating member 86. The supporting rod 83 can be substantially L shaped. A first end of the supporting rod 83 can fixedly coupled to the pressure pipe 42. The switch body 84 can be fixedly coupled to a second end of the supporting rod 83 and positioned above the pressure pipe 42. The switch body 84 can have an inner circuit. The operating member 86 can movably protrude from the switch body 84. The operating member 86 can include an operating body 861 and a roller 862. The operating body 861 can movably protrude from the switch body 84. The roller 862 can be rotatably coupled to the operating body 861 away from the switch body 84.

The resisting member 90 can be coupled to the rod portion 16 and positioned adjacent to the resetting member 40. An inclined surface 92 can be formed on an end surface of the resisting member 90 away from the rod portion 16. The inclined surface 92 can contact with the roller 862.

The accelerator control circuit 80 can change from an operative state to an inoperative state via moving the operating member 86 from the operative position to the inoperative position. The accelerator control switch 82 turns on when the operating member 86 is positioned at an operative position, so that the accelerator control circuit 80 is operative. The accelerator control switch 82 turns off when the operating member 86 is positioned at an inoperative position, so that the accelerator control circuit 80 is inoperative. In the illustrated embodiment, the operative position of the operating member 86 can be where the operating member 86 is positioned adjacent to the rod portion 16; and the inoperative position of the operating member 86 can be where the operating member 86 is positioned away from the rod portion 16.

The resisting member 90 can be moved toward the operating member 86 by the connecting lever 10, the operating member 86 is moved to the inoperative position by the resisting member 90 to break the accelerator control switch 82, and then the accelerator control circuit 80 can be inoperative. The operating member 86 can automatically return the operative position when releasing the brake pad 32, so that the accelerator control circuit 80 can be operative.

In assembly, the brake pedal assembly 30 can be positioned on the second end portion 14 of the connecting lever 10. The accelerator pedal assembly 50 can be rotatably coupled to the brake pedal assembly 30. The resetting member 40 can be positioned between the connecting lever 10 and the vehicle frame 220. The accelerator shaft sensor 81 can be coupled between the holding portion 544 and the rod portion 16. The accelerator switch 82 can be positioned on the resetting member 40 and electrically coupled to the accelerator system. The resisting member 90 can be positioned on the connecting lever 10 and contact the inclined surface 92. The connecting lever 10 can be coupled to the braking system, and the accelerator control circuit 80 can be electrically coupled to the accelerator system.

A foot of the driver usually put on the pedal 101. A front portion of the foot can apply a force on the accelerator pad 52, and then the accelerator pad 52 can rotate about the connecting portion 342. The accelerator shaft sensor 81 can detect the downward movement amount of the accelerator pad 52 and sending the data to the accelerator system for accelerating. The brake pad 32 can move the connecting lever 10 to bring the driving system work, when a rear portion of the foot can apply a force on the brake pad 32. The resisting member 90 can be moved by the connecting lever 10 toward the accelerator switch 82, the operating member 86 can be moved to the inoperative position, and then the accelerator control circuit 80 can be inoperative. The operating member 86 can return the operative position and the accelerator control circuit 80 can be operative when releasing the brake pad 32. In other words, the accelerator control circuit 80 can be rendered inoperative when the resisting member 90 is moved by the accelerator pedal assembly 50 toward the accelerator control switch 82. The accelerator control circuit 80 can be rendered operative when the accelerator pedal assembly 50 is released.

The accelerator switch 82 is positioned in the accelerator control circuit 80. The accelerator switch 82 can be controlled to enable the accelerator control circuit 80 be operative or inoperative by the movement of the connecting lever 10. In emergency, traffic accidents can be avoided, when the driver step on the brake pad 32.

In other embodiments, the resetting member 40 can be not limited to be the nitrogen gas spring, and the resetting member 40 can be a torsion spring. The first bracket 34 can be integrally formed.

In other embodiments, the supporting rod 83 can be omitted, and the accelerator switch 82 can be positioned on other structures of the vehicle frame 200. A gap can exist between the resisting member 90 and the operating member 86.

The embodiments shown and described above are only examples. Many details are often found in the art such as the other features of an accelerator and brake pedal device and a vehicle using the accelerator and brake pedal device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An accelerator and brake pedal device, comprising:
   a connecting lever comprising a first end portion and a second end portion, the first end portion configured to couple with a braking system of a vehicle;
   a brake pedal assembly coupled to the second end portion of the connecting lever;
   an accelerator pedal assembly rotatably coupled to the brake pedal assembly;
   an accelerator control circuit having an accelerator control switch, the accelerator control switch comprising a switch body and an operating member movably protruding from the switch body; and
   a resisting member coupled to the connecting lever away from the brake pedal assembly;
   wherein the accelerator control circuit is capable of changing from an operative state to an inoperative state by the resisting member resisting the operating member from the operative state to the inoperative state.

* * * * *